United States Patent [19]

Nishimura

[11] Patent Number: 4,981,339

[45] Date of Patent: Jan. 1, 1991

[54] LIQUID CRYSTAL DISPLAY DRIVER

[75] Inventor: Toshio Nishimura, Jyoyo, Japan

[73] Assignee: Sharp Kabushiki Kaisha, Osaka, Japan

[21] Appl. No.: 403,982

[22] Filed: Sep. 5, 1989

Related U.S. Application Data

[63] Continuation of Ser. No. 219,846, Jul. 11, 1988, abandoned, which is a continuation of Ser. No. 6,435, Jan. 23, 1987, abandoned.

[30] Foreign Application Priority Data

Jan. 24, 1986 [JP] Japan ..................... 61-14372

[51] Int. Cl.[5] .................. G02F 1/13

[52] U.S. Cl. .................. 350/332; 350/336; 340/765

[58] Field of Search .................. 350/332, 333, 336, 765; 340/784, 250, 756; 364/709

[56] References Cited

U.S. PATENT DOCUMENTS

| | | | |
|---|---|---|---|
| 3,820,108 | 6/1974 | Luce | 340/765 |
| 4,087,861 | 5/1978 | Futagawa et al. | 364/709 |
| 4,113,361 | 9/1978 | Nakano | 350/332 |
| 4,281,901 | 8/1981 | Uriyama | 350/336 |
| 4,288,792 | 9/1981 | Sado et al. | 380/756 |
| 4,356,483 | 10/1982 | Fujita et al. | 350/332 X |
| 4,448,490 | 5/1984 | Shibuya et al. | 350/335 |
| 4,533,213 | 8/1985 | Wasdizuka et al. | 350/332 |

FOREIGN PATENT DOCUMENTS

| | | | |
|---|---|---|---|
| 0083013 | 5/1984 | Japan | 340/765 |

*Primary Examiner*—Stanley D. Miller

*Assistant Examiner*—Huy K. Mai

[57] ABSTRACT

A liquid crystal display driver has a ¼-duty binary-voltage driving system. This driving system generates at least four separate common signals and at least eleven separate segment signals. Although the duty cycle is ¼. $V_{on}/V_{off}$ ratio of the effective value is greater than 1.7. This is accomplished by using four common electrodes and seven segment electrode per each individual pattern generator.

6 Claims, 9 Drawing Sheets

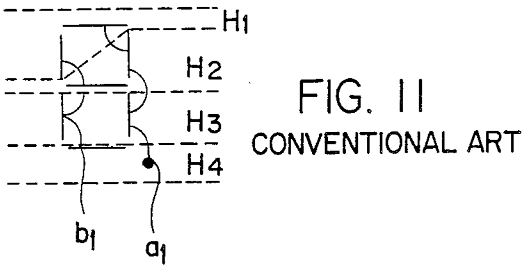
FIG. 11
CONVENTIONAL ART
FIG. 12
CONVENTIONAL ART
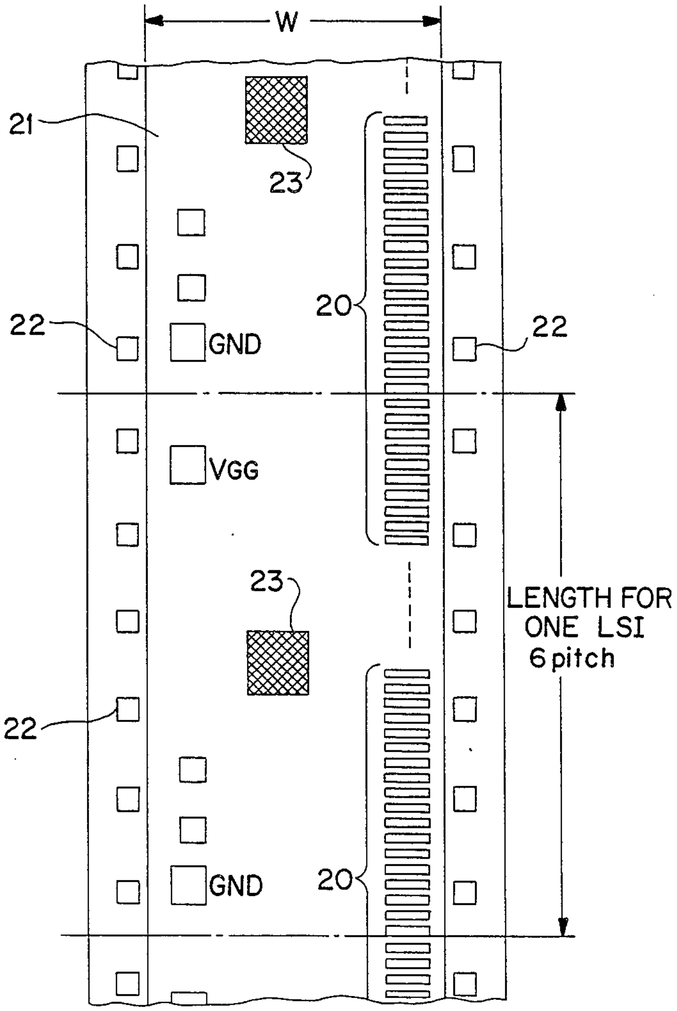

LIQUID CRYSTAL DISPLAY DRIVER

This application is a continuation of application Ser. No. 07/219,846 filed on July 11, 1988, now abandoned, which was a continuation of Ser No. 006,435 filed Jan. 23, 1987, now abandoned.

BACKGROUND OF THE INVENTION

1. Field of the Invention

The present invention relates to a liquid crystal display driver for use in a display unit of a desktop electronic calculator (hereinafter referred to as calculator) or the like.

2. Description of the Prior Art

For duty-driving a liquid crystal display (hereinafter abbreviated LCD), it is necessary to apply a bias voltage so as to obtain a proper on-off effective value. In this operation, at least three voltages have been required inclusive of two intermediate level voltages in addition to a supply voltage. For example, in a dry battery type calculator, a driving operation is performed with $\frac{1}{3}$ duty $\cdot\frac{1}{3}$ bias or $\frac{1}{4}$ duty$\cdot\frac{1}{3}$ bias having two values of intermediate level voltage. The above $\frac{1}{3}$ duty$\cdot\frac{1}{3}$ bias is achieved by signals of the conventional waveforms shown in FIG. 7. Supposing now $E=1.5$ V, the $V_{ON}/V_{OFF}$ ratio $\alpha$ becomes $\sqrt{3}\approx 1.73$. In a solar battery type calculator (hereinafter referred to as SB calculator), it is customary to perform a driving operation with $\frac{1}{3}$ duty$\cdot\frac{1}{2}$ bias having three values of a solar battery voltage, a doubled voltage of the battery obtained through a booster and an intermediate level voltage. In the former dry battery type calculator where intermediate level voltages are obtained by division through a bleeder resistor, the current is slight. However, in the latter SB calculator where the set current is as small as $\frac{1}{2}$ to $\frac{1}{3}$ of the bleeder current in the dry battery type, it is impossible to adopt a means for producing an intermediate level voltage by a bleeder resistor. Therefore, its power source is formed by the use of a booster equipped with two capacitors outside of an LSI. In the above structure, the number of required component parts is increased due to the necessity of a booster, rendering the circuit configuration complicated.

Meanwhile, with regard to another system for duty-driving the LCD at two voltages of a single power source without using such booster which causes the above-mentioned disadvantages, there is a conventional pulse control system that executes driving by pulses of the waveforms shown in FIG. 8 or 9. In the $\frac{1}{2}$ duty pulses of FIG. 8: (a) shows a waveform H1 where h1 represents a selection period and h2 a half selection period; and (b) shows another waveform H2 where h2 represents a selection period and h1 a half selection period. The waveform so shaped as to apply a voltage during each selection period has an effective on-value in common, while the waveform so shaped as not to apply any voltage has an effective off-value.

When $E=1.5V$, $V_{ON}=\sqrt{\frac{3}{4}}\cdot E=1.3$ V and $V_{OFF}=\sqrt{\frac{1}{4}}\cdot E=0.75$ V. Therefore the $V_{ON}/V_{OFF}$ ratio e becomes $\sqrt{3}\approx 1.73$. Meanwhile, in the $\frac{1}{3}$ duty pulse shown in FIG. 9, $V_{ON}=1.22$ V and $V_{OFF}=0.87$ V, so that $a=1.41$. Although it is possible to produce a $\frac{1}{4}$ duty waveform in a similar way, the ratio $\alpha$ comes to be so small as 1.29. Since the contrast of the LCD becomes higher with increase of the ratio $\alpha$, it is customary in the calculator to adopt a system that ensures a greater value of $\alpha$ exceeding 1.73.

The number of signals required for driving the LCD elements can be reduced as the denominator in the LCD-driving duty factor becomes greater, in such a manner that $\frac{1}{3}$ is superior to $\frac{1}{2}$, $\frac{1}{4}$ to $\frac{1}{3}$ and so forth. Therefore, duty drive with such a greater value is desirable on condition that the same display quality can be achieved.

However, in the conventional structure mentioned above, $\frac{1}{2}$ duty is the limit due to the value of a for pulse-driving the liquid crystal display in the calculator, and $\frac{1}{3}$ duty is not employable with respect to the display quality or contrast. Meanwhile for LCD drive in the SB calculator, a $\frac{1}{3}$ duty$\cdot\frac{1}{2}$ bias system is adopted in most cases. In driving an 8-digit LCD, for example, the required signals are 27 in total. As compared therewith, at least 36 signals are required when using $\frac{1}{2}$ duty pulses which consequently bring about an increase in the chip size of an LSI and also a larger number of package pins, thereby causing higher costs of production.

SUMMARY OF THE INVENTION

The objective of the present invention is to provide an improved liquid crystal display driver which is based on a $\frac{1}{4}$ duty binary voltage driving system and is capable of reducing the number of required signals for driving the LCD, thereby realizing a dimensional reduction in the LSI chip with resultant curtailment of the production cost.

For the purpose of achieving the above-mentioned objective, the liquid crystal display driver of the present invention is designed to perform its driving operation with a $\frac{1}{4}$ duty and binary voltages. It is equipped with means for generating at least 4 kinds of common signals and means for generating at least 11 kinds of segment signals, wherein the $V_{ON}/V_{OFF}$ ratio of the effective value is set to be greater than about 1.7, so as to attain reduction in the cost of production.

BRIEF DESCRIPTION OF THE DRAWINGS

The present invention will become more fully understood from the detailed description given and the accompanying drawings which are given by way of illustration only, and thus are not limitative of the present invention and wherein:

FIGS. 1 through 6 show an exemplary embodiment of the present invention, in which:

FIG. 1 is a circuit diagram of a liquid crystal display driver;

FIG. 2 is a timing chart of output signals from a divider and a ring counter shown in FIG. 1;

FIG. 3 is a timing chart of signals from a clock generator, a ROM and a segment shift register latch;

FIGS. 4 (*a*), (*b*) and (*c*) are timing charts of common waveforms, segment waveforms and exemplary applied-voltage waveforms;

FIG. 5 is a connection diagram of a $\frac{1}{4}$ duty segment pattern; and

FIG. 6 illustrates how the liquid crystal display driver is constituted on a tape;

FIGS. 7 through 12 show a conventional liquid crystal driver, in which

FIGS. 7 (*a*), (*b*) and (*c*) are timing charts of common waveforms, segment waveforms and exemplary applied-voltage waveforms in a $\frac{1}{3}$ duty$\cdot\frac{1}{3}$ bias driving system;

FIG. 8 is a timing chart of drive signals in a $\frac{1}{2}$ duty pulse driving system;

FIG. 9 is a timing chart of drive signals in a $\frac{1}{3}$ duty pulse driving system;

FIG. 10 is a circuit diagram of a $\frac{1}{4}$ duty·$\frac{1}{3}$ bias common waveform generator;

FIG. 11 is a connection diagram of a $\frac{1}{4}$ duty segment pattern; and

FIG. 12 illustrates how the liquid crystal display driver is constituted on a tape.

PREFERRED EMBODIMENT OF THE INVENTION

Below an exemplary embodiment of the present invention will be described with reference to FIGS. 1 through 12.

Figure 1:
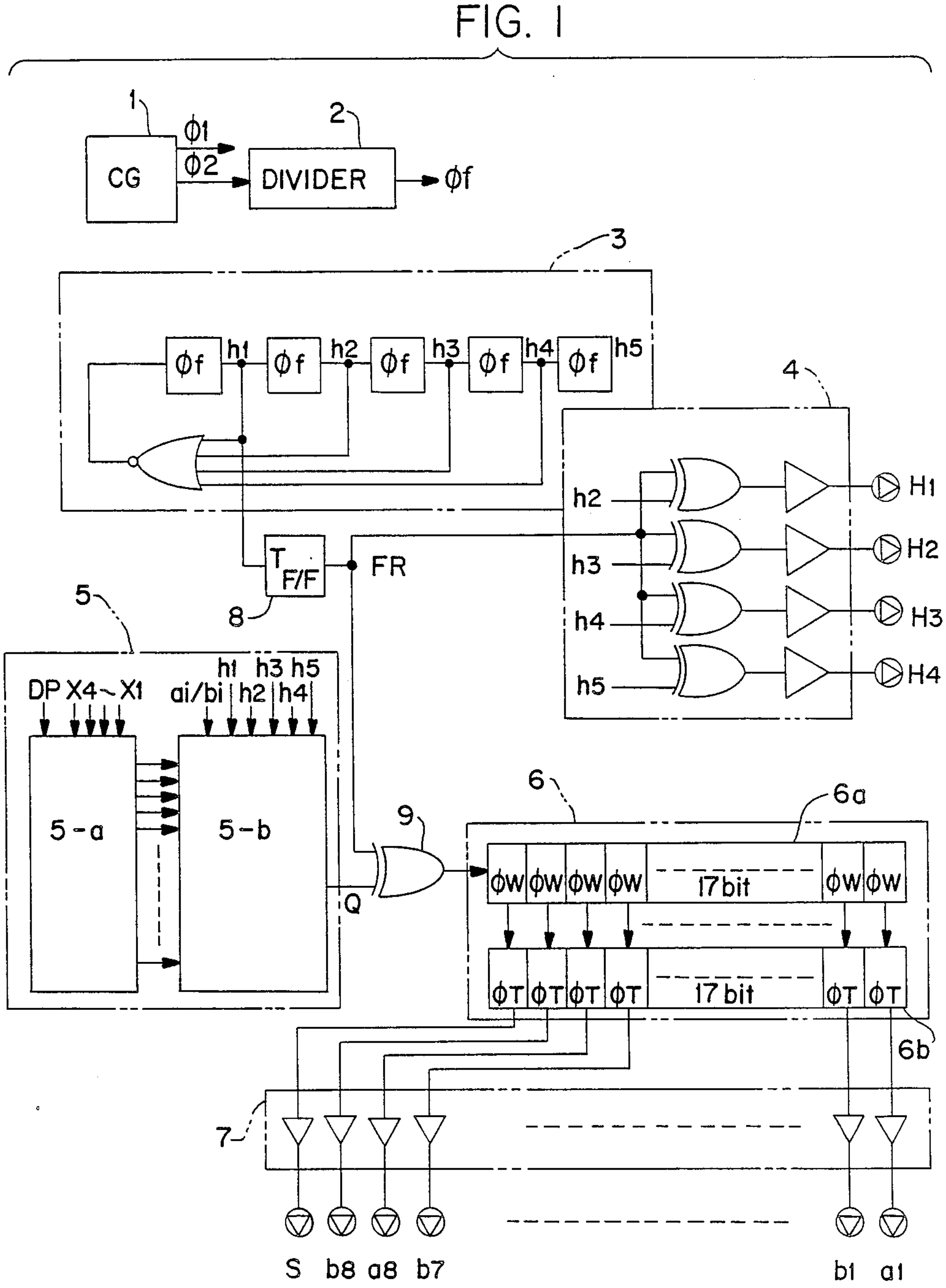

The liquid crystal display driver of the present invention is based on a $\frac{1}{4}$ duty binary voltage driving system as shown in FIG. 1. It comprises a clock generator 1; a divider 2 for producing a display signal by dividing an original oscillation frequency into a frequency Φf; a ring counter 3 for producing timing signals h1-h5; a common driver 4 which is common signal generating means for producing at least 4 separate common waveforms H1-H4; a ROM 5 consisting of a data address decoder 5a and a main ROM 5b to serve as a means for generating at least 11 separate segment signals; a segment shift register/latch 6 consisting of a segment shift register 6a and a segment latch 6b; and a segment driver 7 for driving segment signals. The ring counter 3 is connected to the common driver 4 via a T flip-flop 8 and is further connected to the segment shift register latch 6 via the T flip-flop 8 and an exclusive OR 9. The ROM 5 is connected to the segment shift register/latch 6 via the exclusive OR 9.

Figure 2:
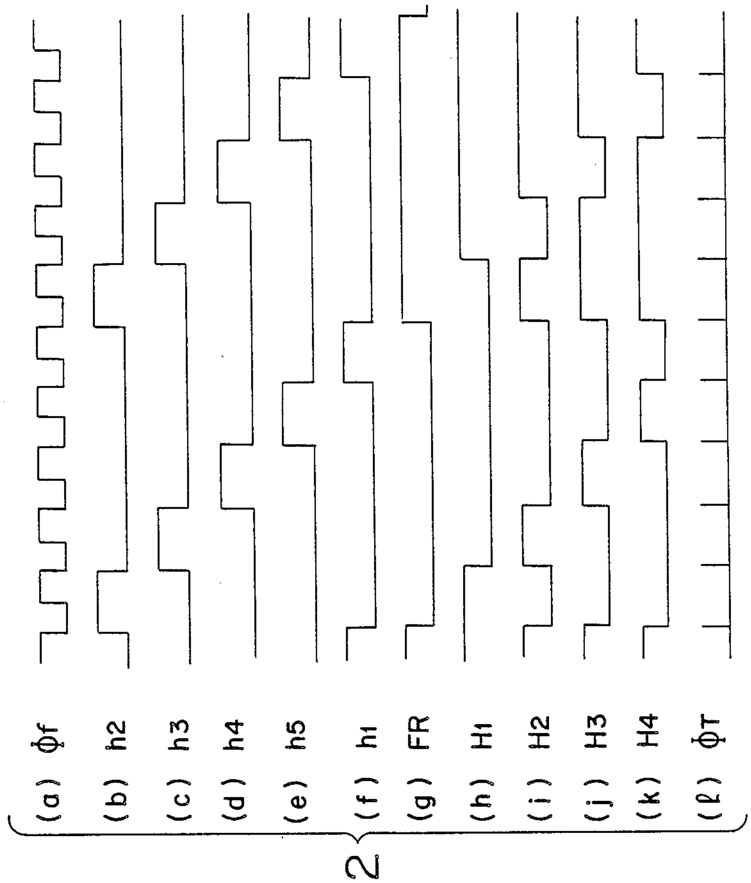
Figure 3:
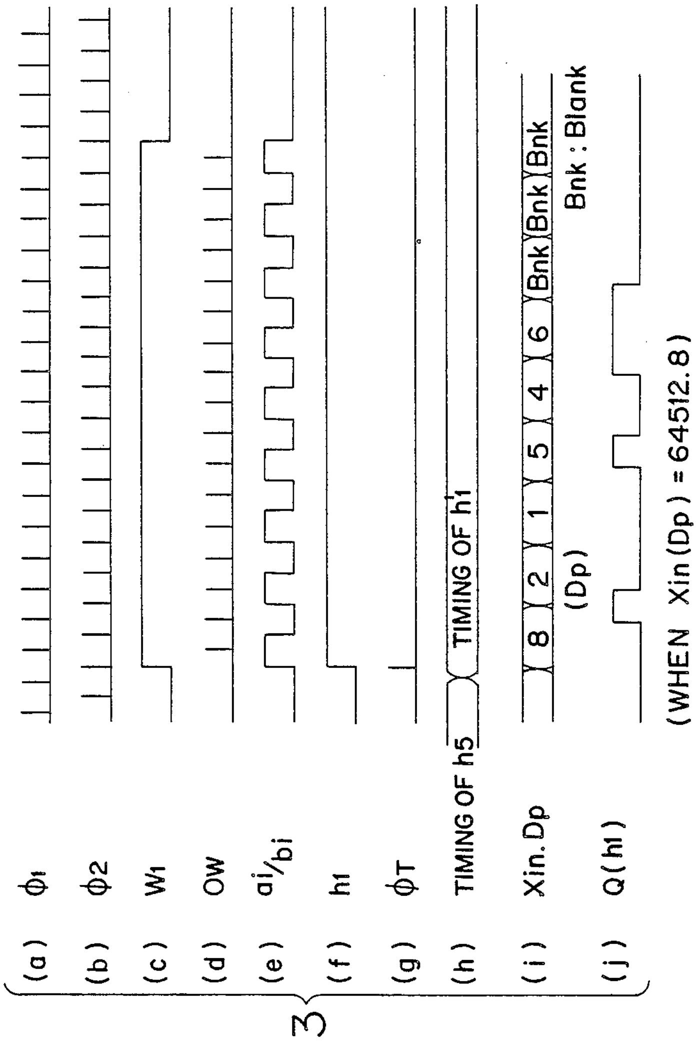

Now the operation of the liquid crystal display driver having the above construction will be described below with reference to the timing charts of FIGS. 2 and 3. The clock generator 1 produces output signals Φ1, Φ2 shown in FIG. 3 (*a*) and (*b*). And the output Φf of the divider 2 as shown in FIG. 2 (*a*) is synchronous with Φ2 as the former is obtained from the latter by frequency division. Accordingly, h1-h5 of FIG. 2 (*b*)-(*f*) and H1-H4 of FIG. 2 (*h*)-(*k*) are also synchronous with Φ2 respectively. The ring counter 3 produces waveforms of h1-h5 by using Φf as clock pulses. A signal FR of FIG. 2 (*g*) is used for inversion per frame and is inverted at the falling edge h1. H1-H4 are EX-OR signals of h2-h5 and FR. The ROM 5 generates segment signals and performs the operation shown in the of truth values of Table 1 where 5 bits of DP and X4-X1 are used as data and 6 bits of ai/bi and h1-h5 as addresses (10 combinations in total since h1-h5 become 1 simultaneously in only one bit thereof).

TABLE 1

| Timing | | $a_i$ | | | | | $b_i$ | | | | |
|---|---|---|---|---|---|---|---|---|---|---|---|
| X in. | DP | $h_1$ | $h_2$ | $h_3$ | $h_4$ | $h_5$ | $h_1$ | $h_2$ | $h_3$ | $h_4$ | $h_5$ |
| 0 | 0 | 0 | 0 | 1 | 0 | 1 | 0 | 0 | 1 | 0 | 1 |
| | 1 | 1 | 1 | 1 | 1 | 0 | 0 | 0 | 1 | 0 | 1 |
| 1 | 0 | 0 | 0 | 1 | 1 | 0 | 0 | 0 | 0 | 0 | 0 |
| | 1 | 0 | 0 | 0 | 1 | 1 | 0 | 0 | 0 | 0 | 0 |
| 2 | 0 | 0 | 1 | 1 | 0 | 0 | 0 | 1 | 0 | 0 | 1 |
| | 1 | 0 | 1 | 0 | 0 | 1 | 0 | 1 | 0 | 0 | 1 |
| 3 | 0 | 0 | 0 | 1 | 0 | 1 | 0 | 1 | 0 | 1 | 0 |
| | 1 | 1 | 1 | 1 | 1 | 0 | 0 | 1 | 0 | 1 | 0 |
| 4 | 0 | 0 | 0 | 1 | 1 | 0 | 1 | 0 | 0 | 1 | 0 |
| | 1 | 0 | 0 | 0 | 1 | 1 | 1 | 0 | 0 | 1 | 0 |
| 5 | 0 | 1 | 0 | 1 | 0 | 0 | 0 | 0 | 0 | 1 | 1 |
| | 1 | 1 | 0 | 0 | 0 | 1 | 0 | 0 | 0 | 1 | 1 |
| 6 | 0 | 1 | 0 | 1 | 0 | 0 | 1 | 1 | 1 | 1 | 0 |
| | 1 | 1 | 0 | 0 | 0 | 1 | 1 | 1 | 1 | 1 | 0 |
| 7 | 0 | 0 | 0 | 1 | 1 | 0 | 0 | 0 | 1 | 1 | 0 |
| | 1 | 0 | 0 | 0 | 1 | 1 | 0 | 0 | 1 | 1 | 0 |
| 8 | 0 | 0 | 0 | 1 | 0 | 1 | 1 | 1 | 1 | 1 | 0 |

TABLE 1-continued

| Timing | | $a_i$ | | | | | $b_i$ | | | | |
|---|---|---|---|---|---|---|---|---|---|---|---|
| X in. | DP | $h_1$ | $h_2$ | $h_3$ | $h_4$ | $h_5$ | $h_1$ | $h_2$ | $h_3$ | $h_4$ | $h_5$ |
| | 1 | 1 | 1 | 1 | 1 | 0 | 1 | 1 | 1 | 1 | 0 |
| 9 | 0 | 0 | 0 | 1 | 0 | 1 | 0 | 0 | 0 | 1 | 1 |
| | 1 | 1 | 1 | 1 | 1 | 0 | 0 | 0 | 0 | 1 | 1 |
| Bn | 0 | 0 | 0 | 0 | 0 | 0 | 0 | 0 | 0 | 0 | 0 |
| k | — | — | — | — | — | — | — | — | — | — | — |

(Bnk: Blank)

Denoted by X4-X1 and DP are signals from an unshown data register, and the output Q of the ROM 5 is obtained in accordance with such contents and the timing of ai/bi and h1-h5. For example, according to the timing of h1 as shown in FIG. 3, first a signal $a_1$ is decoded according to Φw of FIG. 3 (*d*) when ai/bi=1 (timing of ai) in FIG. 3 (*e*) and then is inputted to the segment shift register 6a. In this stage, if the display content of the first digit ($a_1$, $b_1$) is 8, it follows that Q=0 as the ROM 5 produces an output 0 due to Xin=8, DP=0 and a1-h1 from Table 1. In case FR=0, a bit 0 is inputted to the fore (left) end of the segment shift register 6a. At the next timing, Q=1 as ai/bi=0 (bi), Xin=8, DP=0 and h1 from Table 1, so that a bit 1 is inputted to the fore end of the segment shift register 6a according to Φw, and simultaneously the content of the segment shift register 6a is shifted rightward by one bit. When the display content of the second digit is 2, it follows similarly that Q=0 as ai/bi=1, Xin=2, DP=1 and h1; and Q=0 as ai/bi=0, Xi=2, DP=1 and h1. Thereafter the operation is continued until signals for the eighth digit and the symbol digit S are decoded, whereby the entire 17 bits of the segment shift register 6a are filled with data.

Denoted by ΦT in FIG. 2 (*l*) is a signal produced at the falling edge of h1 and serving to decide the timing to transfer the content of the segment shift register 6a to the segment latch 6b in parallel. The 17-bit data decoded at the timing of h1 is transferred to the segment latch 6b according to the pulse ΦT produced synchronously with the fall of h1 and is outputted from terminals a1,b1 . . . S via a buffer of the segment driver 7. The timing after such transfer according to the pulse ΦT corresponds to h2, but the content of the display signal outputted from the terminals corresponds to h1. Any timing error caused by the segment shift register 6a and the segment latch 6b is corrected by changing h2 to H1, h3 to H2, h4 to H3 and h5 to H4 respectively in the common driver 4. At the timing of h2, decoding is executed in accordance with Xin, DP, ai·bi and h2, and after being inputted to the segment shift register 6a, the data is transferred to the segment latch 6b according to the pulse ΦT produced at the falling edge of h2 and then is successively displayed. Thereafter the data is decoded as described above until the timing of h5 and subsequently the procedure is returned to the timing of h1. This operation is performed exactly in the same manner until the output Q of the ROM 5 is obtained, and thereafter the signal FR becomes 1, so that an inverted signal of Q is fed to the segment shift register 6a. Denoted by Xin·DP in FIG. 3 (*i*) is a timing to switch over the data synchronously with Φ2. A shift pulse Φw for the segment shift register 6a is sampled at the timing of Φ1. Shown in FIG. 3 (*j*) is the output waveform of Q (timing of h1) obtained when the content of the display data register representing the values of Xin and DP is 64512.8. The terminal S is provided for turning on a symbol or the like other than seven-segment character segments, and it is usable within a range of combinations of the segment waveforms shown in FIG. 3.

The liquid crystal display driver described above has the following features in comparison with the above-mentioned conventional driver.

Figure 4B:
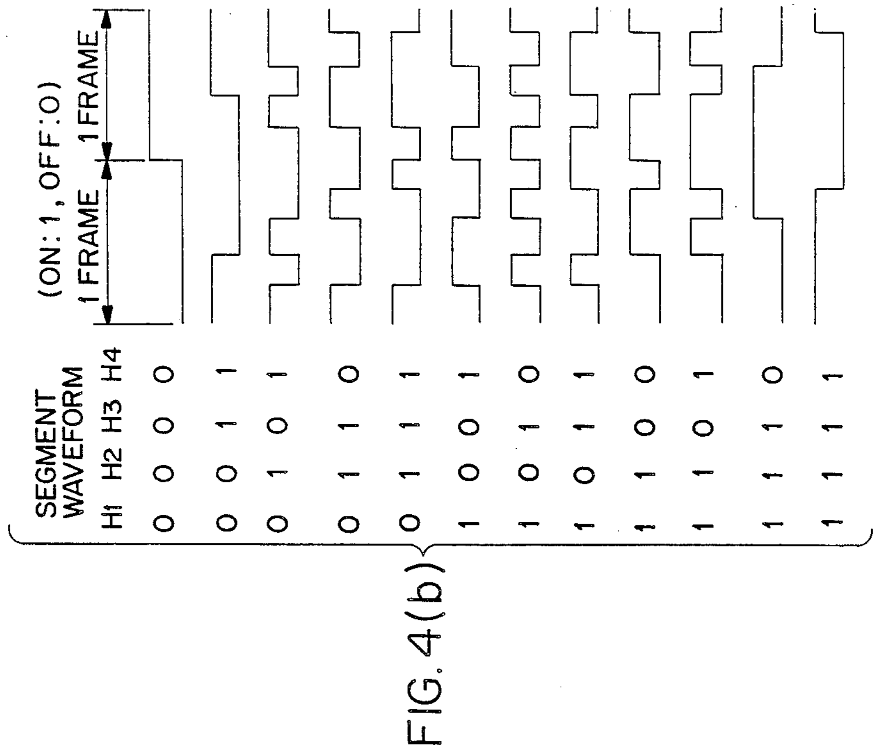
Figure 4A:
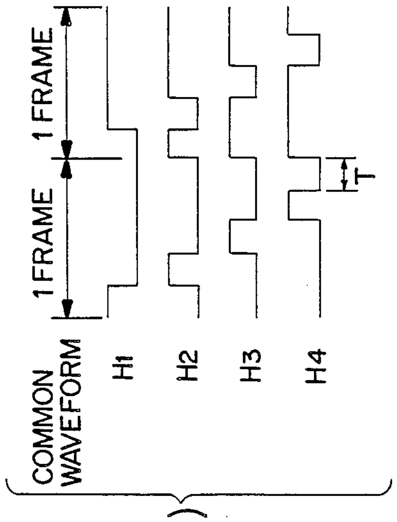
Figure 4C:
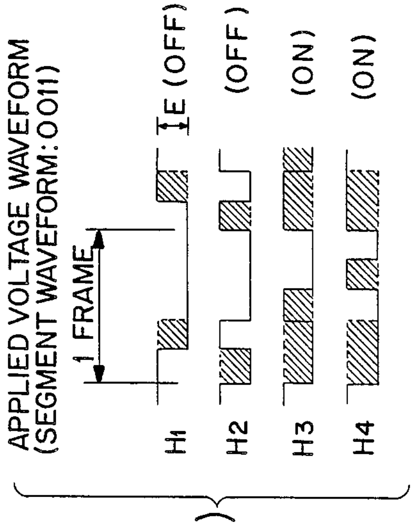
Figure 8:
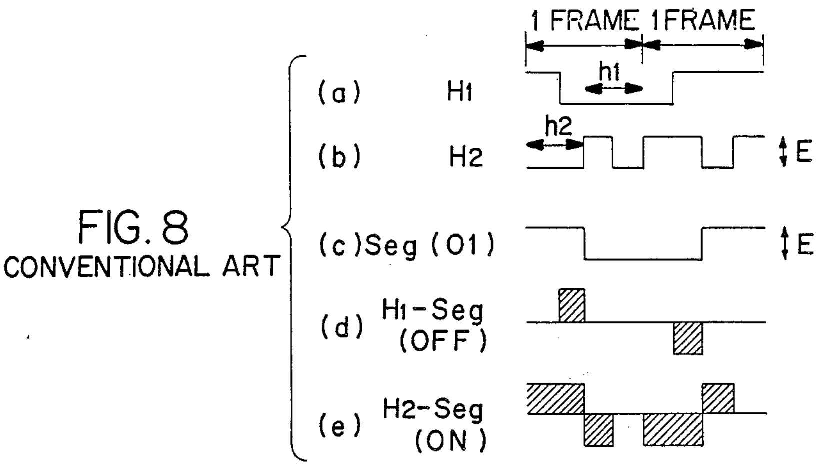
FIG. 8 CONVENTIONAL ART
Figure 9:
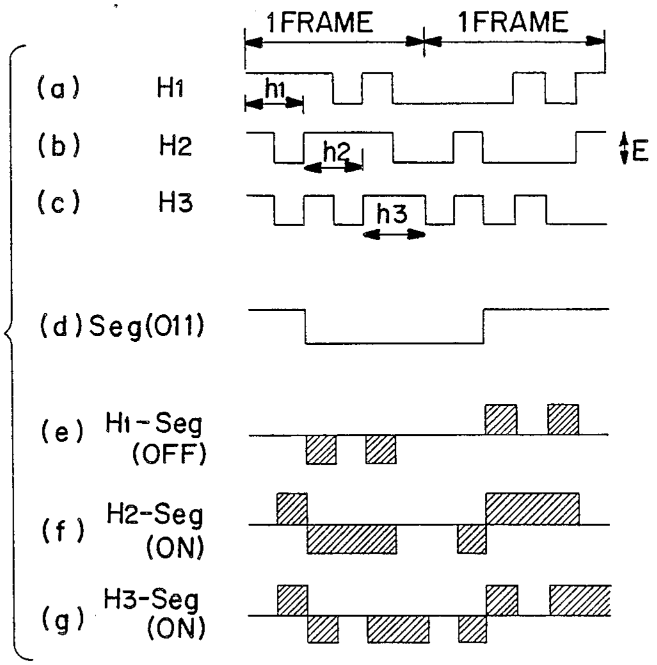
FIG. 9 CONVENTIONAL ART
Figure 10:
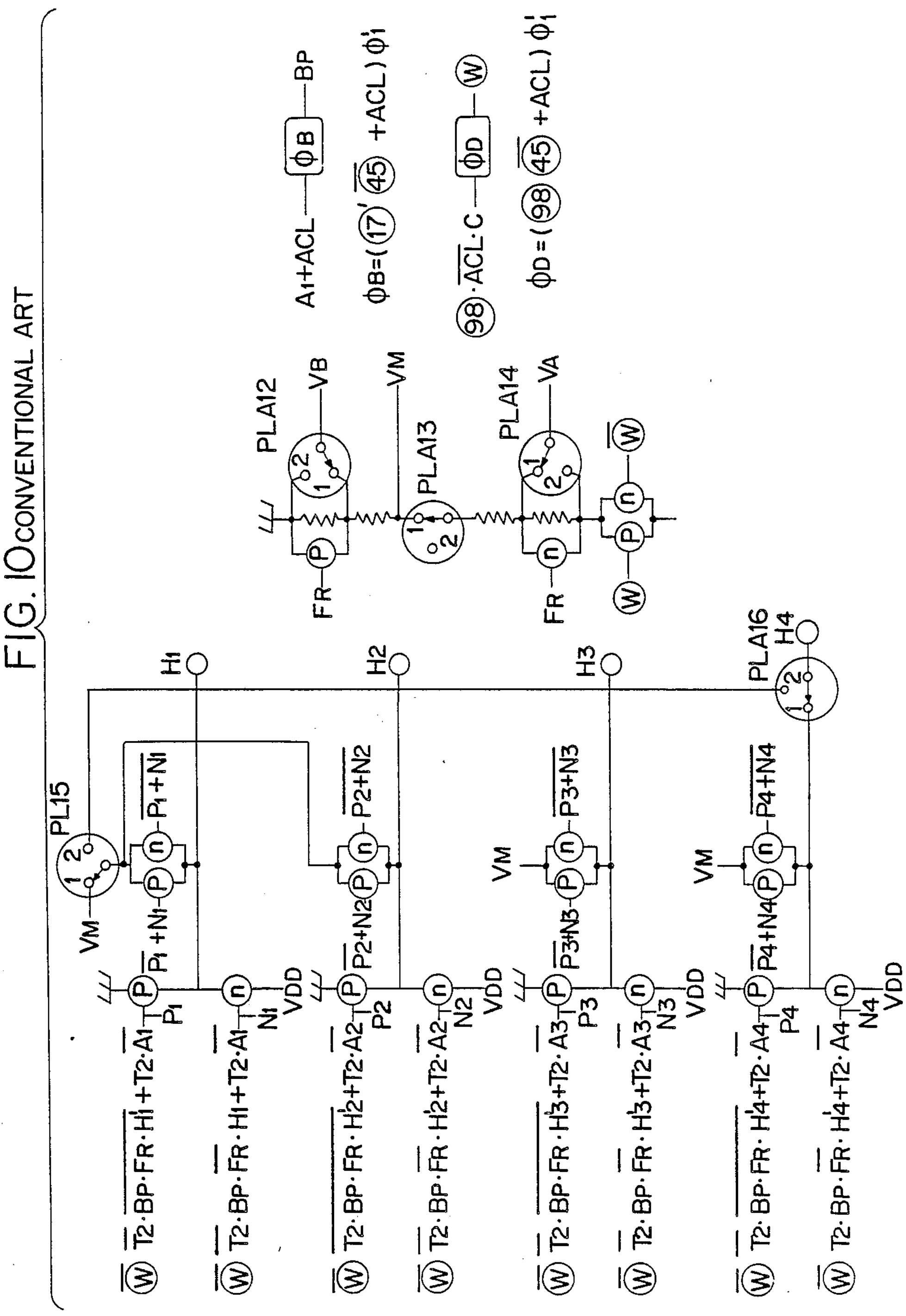
FIG. 10 CONVENTIONAL ART

(1) With regard to the driving signal waveform shown in FIG. 4, the portions corresponding to h1 and h2 in the driving pulses of FIG. 8 exist merely as timing, and the respective effective values are obtainable throughout the entirety of one frame. The timing is composed of 5 bits despite ¼ duty and fulfills an important role as a correction period for ensuring a proper effective value relative to the portion denoted by T in FIG. 4 (*a*).

(2) When E=1.5, the effective value of the driving signal waveform is, from FIG. 4, $V_{ON}=\sqrt{3/5}\cdot E=1.16$ V and $V_{OFF}=\sqrt{1/5}\cdot E=0.67$ V. Although this value is about 10% smaller than that obtained in the pulse drive of FIG. 8, it may be taken into consideration at the time of selecting Vth of the LCD. The $V_{ON}/V_{OFF}$ ratio $\alpha$ becomes $\sqrt{3}\approx 1.73$, which is equal to the value in the above-mentioned pulse drive.

(3) Due to the ¼ duty, the number of required drive signals in an 8-digit desktop electronic calculator is 21 which is 15 less signals as compared with ½ duty pulses corresponding to a greater than 40% reduction in signals, whereby the number of pads for the LSI chip can be diminished, eventually realizing a dimensional reduction of both the LSI and the apparatus to which the present invention is applied. Furthermore, since the number of package pins can also be diminished, it becomes possible to lower the production cost of the LSI. In addition, the common driver 4 shown in FIG. 1 is widely simplified in comparison with the conventional ¼ duty·⅓ bias common signal generator of FIG. 10.

(4) The ¼-duty binary-voltage driving system adopted in the present invention is contrived in the following manner correspondingly to a seven-segment character pattern. As is apparent from the waveforms of FIG. 4, 16 patterns which can be formed by on-off combinations of H1–H4 to not exist in this system. There are merely 12 patterns with the exception of 4 patterns where one of H1–H4 is on while the remaining three are off. Meanwhile, in the case of representing 0–9 (inclusive of a sign . ) using seven-segment character segments, only 11 patterns of on-off combinations are needed as Tables 4 and 5 according to the conventional method of connecting ¼ duty segments shown in FIG. 11. However, Table 5 includes a pattern (1000) which does not exist in FIG. 4, so that it is not directly usable without any change. Accordingly, with respect to the seven-segment character segment pattern, the combinations have been modified to those shown in FIG. 5. Patterns of such modified combinations are shown in Tables 2 and 3. The patterns of Table 3 are included in those of FIG. 4 and can therefore be displayed. The denotation of "x" in ai–H4 of Table 4 and ai–H3 of Table 3 represents either 1 or 0, signifying that there are two cases, one with and one without a decimal point.

TABLE 2

| | $a_i$ | | | | $b_i$ | | | |
|---|---|---|---|---|---|---|---|---|
| | $H_1$ | $H_2$ | $H_3$ | $H_4$ | $H_1$ | $H_2$ | $H_3$ | $H_4$ |
| 1. | 1 | 1 | X | 0 | 0 | 0 | 0 | 0 |
| 2. | 1 | 0 | X | 1 | 1 | 0 | 1 | 1 |
| 3. | 1 | 1 | X | 1 | 1 | 0 | 1 | 0 |
| 4. | 1 | 1 | X | 0 | 0 | 1 | 1 | 0 |

TABLE 2-continued

| | $a_i$ | | | | $b_i$ | | | |
|---|---|---|---|---|---|---|---|---|
| | $H_1$ | $H_2$ | $H_3$ | $H_4$ | $H_1$ | $H_2$ | $H_3$ | $H_4$ |
| 5. | 0 | 1 | X | 1 | 1 | 1 | 1 | 0 |
| 6. | 0 | 1 | X | 1 | 1 | 1 | 1 | 1 |
| 7. | 1 | 1 | X | 0 | 1 | 1 | 0 | 0 |
| 8. | 1 | 1 | X | 1 | 1 | 1 | 1 | 1 |
| 9. | 1 | 1 | X | 1 | 1 | 1 | 1 | 0 |
| 0. | 1 | 1 | X | 1 | 1 | 1 | 0 | 1 |

TABLE 3

| Entire patterns of ai and bi (11 patterns) | | | | | | | |
|---|---|---|---|---|---|---|---|
| 0 | 0 | 0 | 0 | 1 | 0 | 0 | 1 |
| 0 | 1 | 0 | 1 | 1 | 0 | 1 | 0 |
| 0 | 1 | 1 | 0 | 1 | 0 | 1 | 1 |
| 0 | 1 | 1 | 1 | 1 | 1 | 0 | 0 |
| | | | | 1 | 1 | 0 | 1 |
| | | | | 1 | 1 | 1 | 0 |
| | | | | 1 | 1 | 1 | 1 |

TABLE 4

| | $a_i$ | | | | $b_i$ | | | |
|---|---|---|---|---|---|---|---|---|
| | $H_1$ | $H_2$ | $H_3$ | $H_4$ | $H_1$ | $H_2$ | $H_3$ | $H_4$ |
| 1. | 0 | 1 | 1 | X | 0 | 0 | 0 | 0 |
| 2. | 1 | 1 | 0 | X | 0 | 1 | 1 | 1 |
| 3. | 1 | 1 | 1 | X | 0 | 1 | 0 | 1 |
| 4. | 0 | 1 | 1 | X | 1 | 1 | 0 | 0 |
| 5. | 1 | 0 | 1 | X | 1 | 1 | 0 | 1 |
| 6. | 1 | 0 | 1 | X | 1 | 1 | 1 | 1 |
| 7. | 1 | 1 | 1 | X | 1 | 0 | 0 | 0 |
| 8. | 1 | 1 | 1 | X | 1 | 1 | 1 | 1 |
| 9. | 1 | 1 | 1 | X | 1 | 1 | 0 | 1 |
| 0. | 1 | 1 | 1 | X | 1 | 0 | 1 | 1 |

TABLE 5

| Entire patterns of ai and bi (11 patterns) | | | | | | | |
|---|---|---|---|---|---|---|---|
| 0 | 0 | 0 | 0 | 1 | 0 | 0 | 0 |
| 0 | 1 | 0 | 1 | 1 | 0 | 1 | 0 |
| 0 | 1 | 1 | 0 | 1 | 0 | 1 | 1 |
| 0 | 1 | 1 | 1 | 1 | 1 | 0 | 0 |
| | | | | 1 | 1 | 0 | 1 |
| | | | | 1 | 1 | 1 | 0 |
| | | | | 1 | 1 | 1 | 1 |

Figure 6:
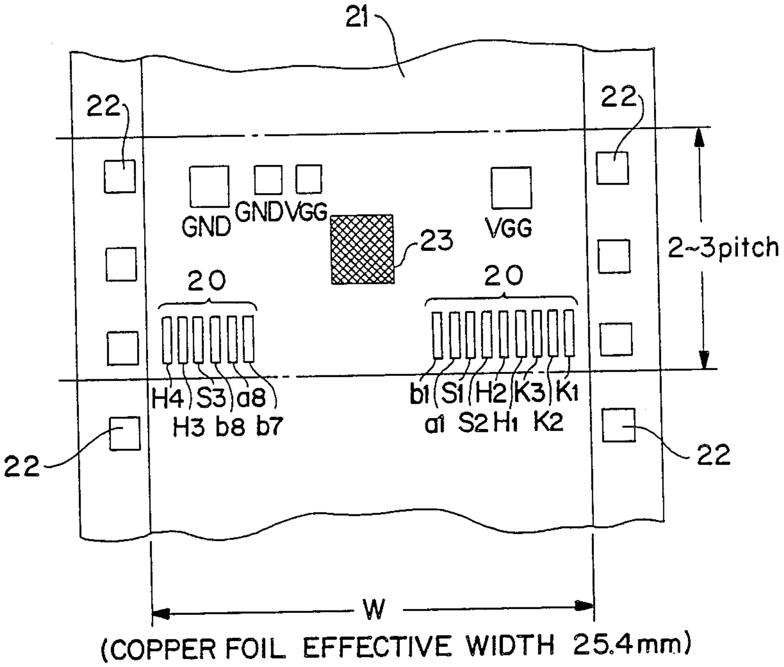
Figure 5:
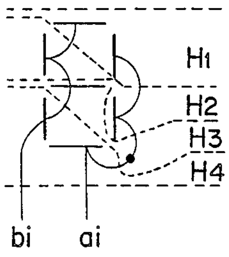
Figure 7A:
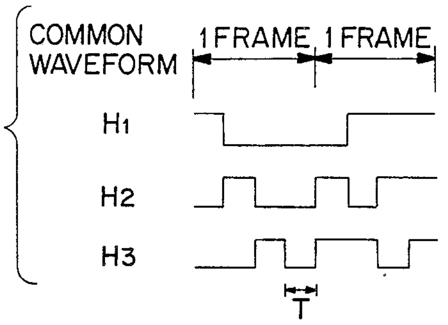
FIG. 7(a) CONVENTIONAL ART
Figure 7B:
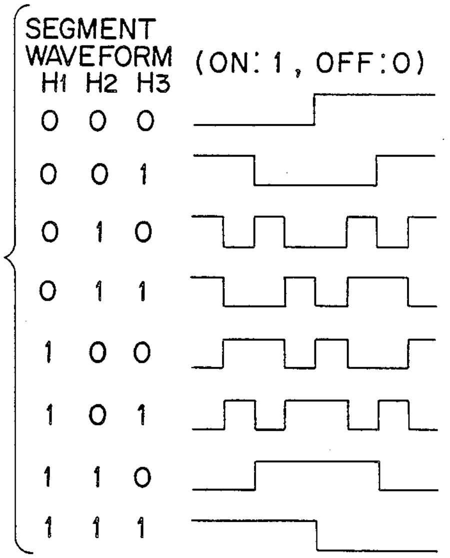
FIG. 7(b) CONVENTIONAL ART
Figure 7C:
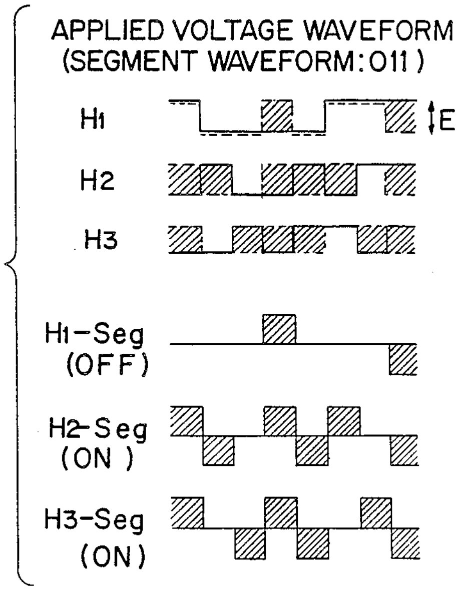
FIG. 7(c) CONVENTIONAL ART

(5) In this display driver when the number of both LCD driving signals and package pins are diminished, the terminals can be disposed in an improved array particularly when manufacturing an LSI package with a film carrier using the art of TAB (tape automated bonding), thereby attaining remarkable effects in reducing the number of film pitches and curtailing the material cost. FIG. 12 illustrates an exemplary arrangement of a conventional film carrier LSI, wherein terminals 20 for the LCD and keys are arrayed in parallel with one another in the longitudinal direction of a tape 21, and the width of the LSI is determined by that of the tape 21 (actually the effective width W with the exception of sprockets 22 . . . ). The number of pitches or sprockets 22 is adjusted in accordance with the number of terminals 20 to determine the tape length for each LSI 23. The number of terminals 20 . . . disposable within one pitch is determined substantially by the mounting precision. Supposing that the terminal pitch is 0.9 mm as illustrated in FIG. 12, a tape length of 27.9 mm is required for arraying 31 terminals 20, thereby necessitating 6 pitches. Meanwhile 26 terminals are provided in the present invention as shown in FIG. 6, so that the required tape length is 23.4 mm which corresponds to 5 pitches. However, since the transverse effective length of the tape 21 is 25.4 mm, it becomes possible to achieve a transverse array of terminals 20. In contrast with the tape 21 of FIG. 12 where power terminals and component mounting pads are arrayed transversely with margin space, the possibility exists in the example of FIG. 6 that the density can be increased to 2–3 pitches corresponding to 9.5–14.25 mm. Consequently, as compared with 6 pitches in the conventional structure, the number of film pitches can be diminished to a half, eventually accomplishing wide reduction of the required material with curtailment of the production cost.

As described above, the liquid crystal display driver of the present invention is based on a ¼-duty binary-voltage driving system and is equipped with means for generating at least 4 kinds of common signals and a means for generating at least 11 kinds of segment signals, wherein the $V_{on}/V_{off}$ ratio is set to be greater than about 1.7, so that the following advantage are attainable.

(1) Due to its operation performed with a single power source, no booster is required which consequently simplifier the circuit configuration. Therefore a capacitor for the booster can be eliminated to reduce the number of component parts, whereby a dimensional reduction is achievable relative to the LSI chip with resultant curtailment of the production cost.

(2) The number of LCD driving terminals can be diminished as compared with the known device to eventually reduce the dimensions of the LSI package, hence curtailing the production cost of the LSI and rendering the display driver more compact.

(3) Because of the nonnecessity of a booster, the driving voltage can be lowered to eventually decrease the power consumed in the LSI and LCD. Accordingly, it becomes possible to realize a smaller power source with reduced production cost.

While only certain embodiments of the present invention have been described, it will be apparent to those skilled in the art that various changes and modifications may be made therein without departing from the spirit and scope of the present invention as claimed.

What is claimed is:

1. A liquid crystal display driver having ¼-duty binary voltage driving system, comprising:

means for generating at least four common signals;

means for generating at least two common data signals;

display means, responsive to said common signals and said common data signals, for displaying character patterns;

said display means having four common electrodes and eight segment electrodes to generate one character pattern, said common electrodes and segment electrodes being driven by said ¼-duty cycle;

said eight segment electrodes being divided into two groups of four segment electrodes, one group of four segment electrodes being connected to a single common data electrode while the other group of four segment electrodes being connected to another single common electrode data;

each of said group of four segment electrodes being driven by one said common data signal for the corresponding common data electrode and a combination of each of said four common signals, each being in one of an ON(1) and OFF(0) state and corresponding to each of said four common electrodes, respectively, such that said four common signal combination does not include one of said common signals being ON and the remaining common signals being OFF; and wherein a $V_{on}/V_{off}$ ratio for said display means is set to be greater than 1.7.

2. The liquid crystal display driver as claimed in claim 1, wherein said character patterns displayed by said display means are formed by an eight segment figure.

3. A liquid crystal display driver system, comprising:

display means for displaying character patterns;

said display means having four common electrodes and eight segment electrodes to generate a single character pattern, said eight segment electrodes being divided into two groups of four segment electrodes, one group of four segment electrodes being connected to a first common data electrode while the other group of four segment electrodes being connected to a second common data electrode;

scan signal generating means, operatively connected to said four common electrodes, for generating four scan signals;

data signal generating means, operatively connected to said first and second common data electrodes, for generating data signals; and timing means, operatively connected to said scan signal generating means and said data signal generating means, for producing timing signals to be used to generate said scan signals and said data signals;

said scan signal generating means generating scan signals having a ¼-duty-cycle;

said data signal generating means including, memory means, operatively connected to said timing means, for generating data signals in response to received timing signals; and latch means, operatively connected to said memory means, for temporarily storing said data signals corresponding to a single scan signal;

said display means having a $V_{ON}/V_{OFF}$ ratio greater than 1.7.

4. The system as claimed in claim 3, further comprising:

frame reversal means, operatively connected to said timing means, said scan signal generating means and said data signal generating means, for producing a frame reversal signal, said frame reversal signal reversing the polarity of said scan signals and said data signals at each new frame.

5. The system as claimed in claim 4, wherein said timing means generates five subscan signals, said five subscan signals being logically combined with said frame reversal signal to produce said four scan signals.

6. The system as claimed in claim 3, wherein said data signal generating means produces eleven distinct data signals.

* * * * *